(12) United States Patent
Mappus et al.

(10) Patent No.: US 11,374,994 B2
(45) Date of Patent: *Jun. 28, 2022

(54) STREAMING CONTENT CACHE SCHEDULING

(71) Applicant: AT&T Intellectual Property I, L.P., Atlanta, GA (US)

(72) Inventors: Rudolph Mappus, Plano, TX (US); Vijayan Nagarajan, Plano, TX (US); Sheldon Meredith, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,408

(22) Filed: Jun. 14, 2021

(65) Prior Publication Data

US 2021/0306395 A1 Sep. 30, 2021

Related U.S. Application Data

(63) Continuation of application No. 16/518,229, filed on Jul. 22, 2019, now Pat. No. 11,038,940.

(51) Int. Cl.
*H04L 65/60* (2022.01)
*H04L 67/10* (2022.01)
*H04L 43/0876* (2022.01)

(52) U.S. Cl.
CPC .......... *H04L 65/60* (2013.01); *H04L 43/0876* (2013.01); *H04L 67/10* (2013.01)

(58) Field of Classification Search
CPC ............... H04L 41/147; H04L 67/2847; H04L 65/4084; H04L 43/16; H04L 65/60;
(Continued)

(56) References Cited

U.S. PATENT DOCUMENTS 8,479,228 B1 * 7/2013 Simon ................ H04N 21/2668
725/34
10,261,938 B1 * 4/2019 Jenkins ............... G06F 16/9574
(Continued)

FOREIGN PATENT DOCUMENTS

JP 2011154487 A * 8/2011
WO WO-2013175058 A1 * 11/2013 ......... G06Q 30/0277

OTHER PUBLICATIONS

Bouras, Christos & Konidaris, Agisilaos & Kostoulas, Dionysios. (2003). A Most Popular Approach of Predictive Prefetching on a WAN to Efficiently Improve WWW Response Times. 3033. 344-351. 10.1007/978-3-540-24680-0_58. Dec. 2003, Lecture Notes in Computer Science; 8 pages.
(Continued)

*Primary Examiner* — Caroline H Jahnige

(57) ABSTRACT

A processing system including at least one processor may collect a first set of time series features relating to requests for a content item at a content distribution node in a communication network, generate a first prediction model based upon the first set of time series features to predict levels of demand for the content item at the content distribution node at future time periods, identify, via the first prediction model, a first time period of the future time periods when a predicted level of demand for the content item exceeds a threshold level of demand, identify a second time period of the future time periods when a predicted level of utilization of the communication network is below a threshold level of utilization, the second time period being prior to the first time period, and transfer the content item to the content distribution node in the second time period.

20 Claims, 3 Drawing Sheets

(58) Field of Classification Search
CPC ... H04L 43/0876; H04L 67/10; H04L 41/145; H04L 65/1016; H04L 65/1063; H04L 65/80

See application file for complete search history.

(56) References Cited

U.S. PATENT DOCUMENTS

| | | | | |
|---|---|---|---|---|
| 2014/0379835 | A1* | 12/2014 | Foerster | H04L 67/325 709/213 |
| 2016/0028648 | A1* | 1/2016 | Wohlert | H04L 67/325 709/226 |
| 2016/0294956 | A1* | 10/2016 | Fix | H04L 41/147 |
| 2017/0076198 | A1* | 3/2017 | Jin | G06N 3/08 |
| 2018/0288453 | A1* | 10/2018 | Schmidt | H04L 65/602 |
| 2019/0230185 | A1* | 7/2019 | Dhanabalan | H04L 12/1407 |

OTHER PUBLICATIONS

Chang, Zheng & Lei, Lei & Zhou, Zhenyu & Mao, Shiwen. (2018). Learn to Cache: Machine Learning for Network Edge Caching in the Big Data Era. IEEE Wireless Communications. 25. 28-35. 10.1109/MWC.2018.1700317. Jun. 2018, IEEE Wireless Communications; 8 pages.

Andrew Berglund, "How Data Science Helps Power Worldwide Delivery of Netflix Content". Netflix Technology Blog, May 25, 2017; 7 pages.

Yuanxing Zhang, et al. (2018). Proactive Video Push for Optimizing Bandwidth Consumption in Hybrid CDN-P2P VoD Systems. 2555-2563. 10.1109/INFOCOM.2018.8485962. Conference: IEEE INFOCOM 2018—IEEE Conference on Computer Communications, Apr. 2018; 9 pages.

* cited by examiner

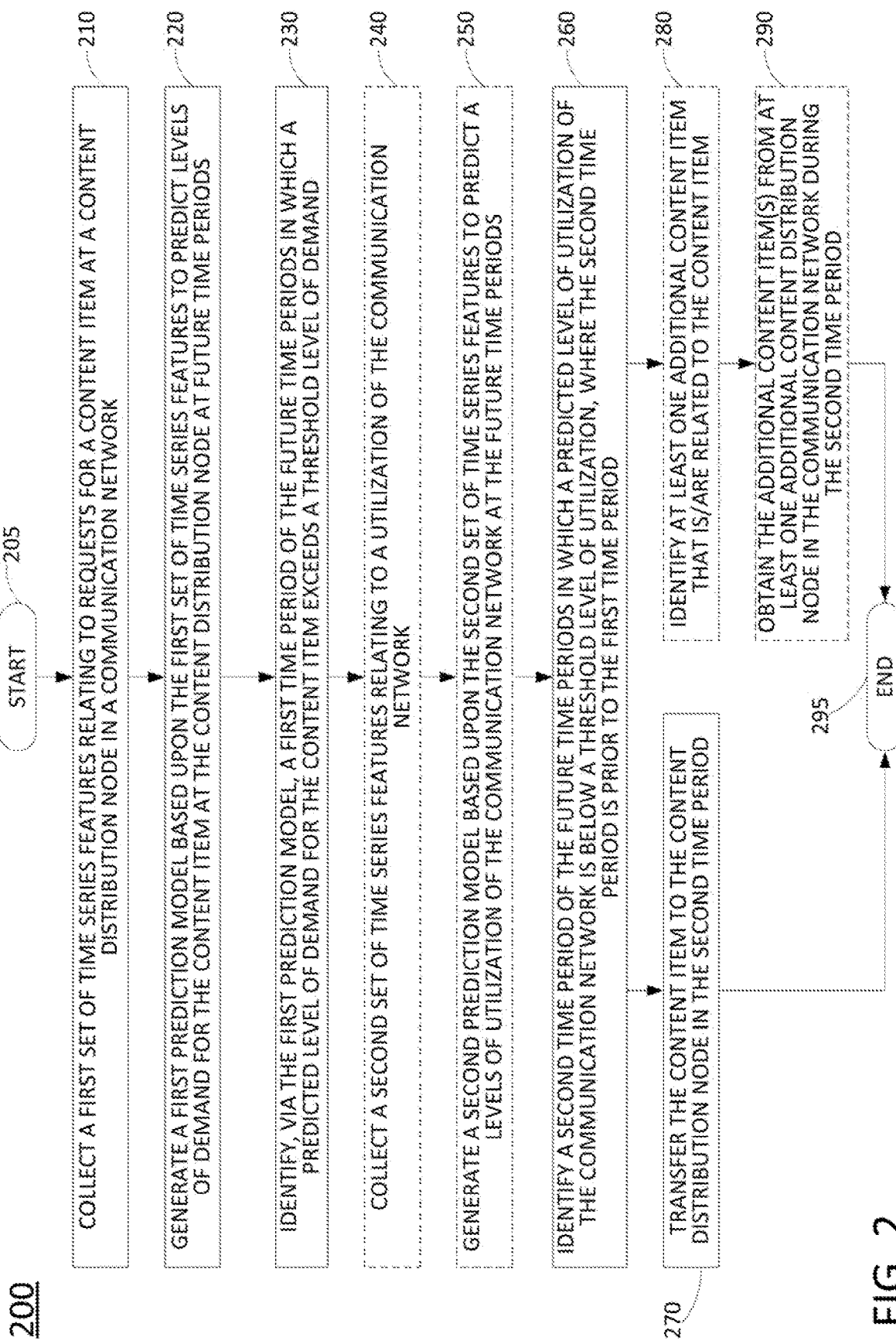

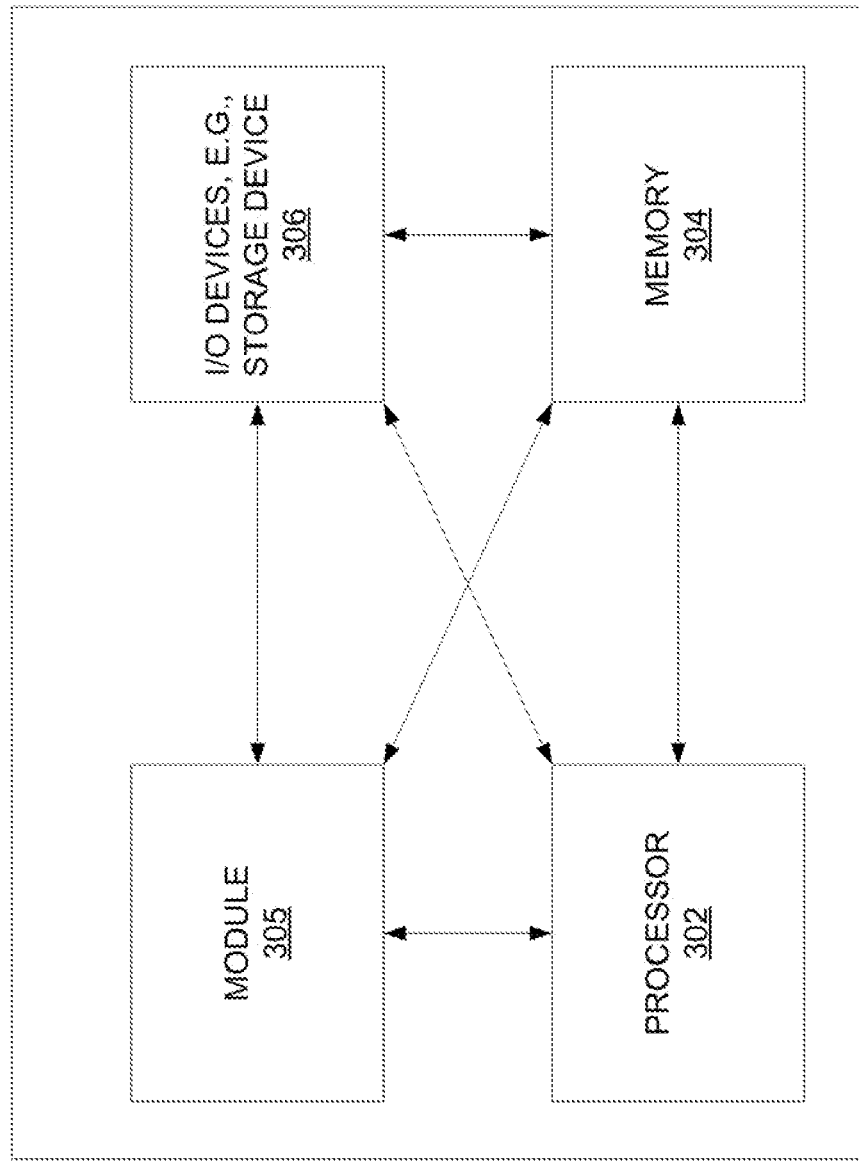

STREAMING CONTENT CACHE SCHEDULING

This application is a continuation of U.S. patent application Ser. No. 16/518,229, filed Jul. 22, 2019, now U.S. Pat. No. 11,038,940, which is herein incorporated by reference in its entirety.

The present disclosure relates generally to content streaming, e.g., video streaming, and more particularly to methods, non-transitory computer-readable media, and apparatuses for transferring a content item to a content distribution node prior to a time period in which a predicted level of demand for the content item exceeds a threshold level of demand.

BACKGROUND

Delivering streaming media content to consumers presents a number of challenges to network infrastructure. Being able to deliver customer specific content at the highest quality of service represents a distinguishing customer experience for providers, but may require significant resources to guarantee network capacity matches customer demands. Network throughput can be challenged by consumption rates and patterns. In delivering content to customers, caching data that is most frequently needed as close to the customer as possible in the network improves throughput in the network. At the same time, caching data that is not used represents a missed opportunity to localize content demands.

SUMMARY

In one example, the present disclosure describes a method, computer-readable medium, and apparatus for transferring a content item to a content distribution node prior to a time period in which a predicted level of demand for the content item exceeds a threshold level of demand. For instance, a processing system including at least one processor may collect a first set of time series features relating to requests for a content item at a content distribution node in a communication network, generate a first prediction model based upon the first set of time series features to predict levels of demand for the content item at the content distribution node at future time periods, identify, via the first prediction model, a first time period of the future time periods when a predicted level of demand of the levels of demand for the content item exceeds a threshold level of demand, identify a second time period of the future time periods when a predicted level of utilization of the communication network is below a threshold level of utilization, the second time period being prior to the first time period, and transfer the content item to the content distribution node in the second time period.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for transferring a content item to a content distribution node prior to a time period in which a predicted level of demand for the content item exceeds a threshold level of demand; and FIG. 3 illustrates a high level block diagram of a computing device or system specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
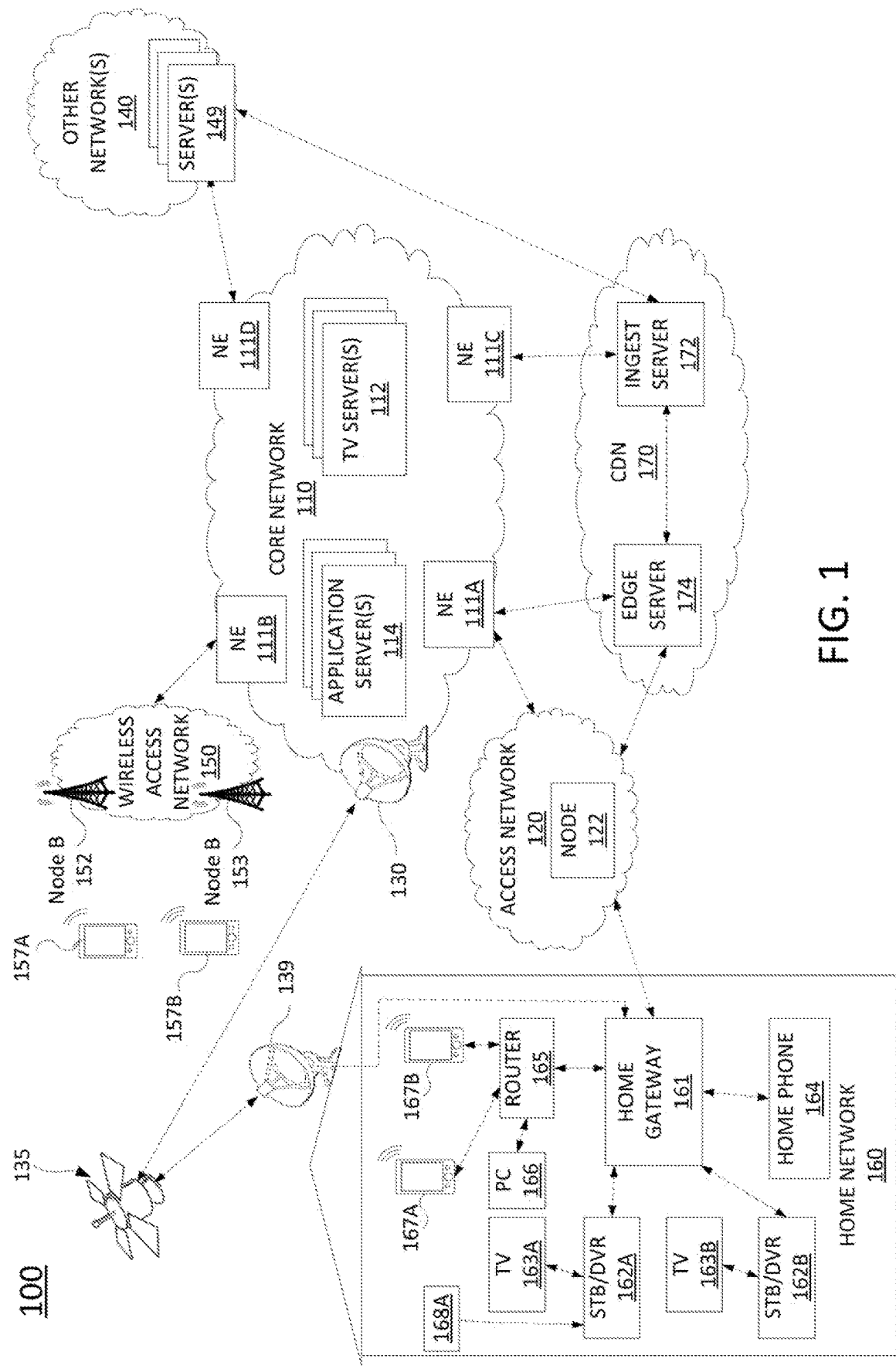
FIG. 1 illustrates an example network related to the present disclosure.

Examples of the present disclosure describe methods, computer-readable media, and apparatuses for transferring a content item to a content distribution node prior to a time period in which a predicted level of demand for the content item exceeds a threshold level of demand. In particular, examples of the present disclosure cache content at content distribution nodes in a way that optimizes cached content utilization and improves network throughput by eliminating upstream requests. For instance, the present disclosure may continuously observe and estimate consumption patterns for a particular content item at a particular content distribution node to predict demand for the content item at one or more future time periods. As described in greater detail below, regression techniques may be used to derive the prediction(s) from the historical observations. In order to have a positive effect on network throughput, cache updates (requests for content at each cache) should minimally impact the throughput. To achieve this objective, the present disclosure may also predict network level throughput based on historical data. The present disclosure may then solve the optimization problem of what content to update to which network cache when there is network capacity to do so.

In particular, the present examples maximize cache utilization over a communication network, where caches are placed at network aggregation points, also referred to herein as content distribution nodes. Each content distribution node learns patterns of data usage and recovers a cache update schedule based on these patterns. In addition, a forecasting system learns throughput availability patterns over the wider communication network. A throughput availability schedule is pushed to each content distribution node. The content distribution nodes may then optimize their cache update schedules with throughput availability schedules to optimize throughput impacts from cache updates. In one example, each cache (e.g., each content distribution node) is uniquely identified, and each cache location is registered (e.g., via an Internet Protocol (IP) address or the like) to a centralized throughput availability schedule generation component (e.g., a processing system comprising one or more processors deployed on one or more servers).

The ability to forecast content consumption is driven by observing historical consumption at the content distribution nodes. To achieve this, the present disclosure tracks content requests and constructs time series based features: moving averages of content requests at different intervals of time as well as functions of moving averages: exponential moving average, double exponential moving average, exponential smoothing of moving averages, and so forth (all of which may also broadly be referred to as moving averages). In one example, the present disclosure uses several time intervals, such as 1, 2, 5, 30, 60, and 90 day intervals, for instance. In one example, these time intervals may also be with respect to the day-of-week (e.g. a 5 day moving average, a 5 day-of-week moving average, a 30 day moving average, etc.).

In one example, the present disclosure may compile up to 100 or more time series-based features related to content consumption to predict content demand at future time periods (e.g., for a next day and up to several weeks). Using time series-based features, collected over time, the present disclosure may train a statistical inference model, or prediction model, that predicts content demand for a target future time period. In one example, the statistical inference model is trained via a gradient boosted machine (GBM). The present disclosure may recover a schedule of content to place in the cache of a content distribution node using these predictions. In particular, the content distribution node may compare predicted content consumption to current cache contents and stage requests for content not in the cache but predicted to be in demand at the future time period.

In one example, the prediction model comprises a linear function of the features, such as in accordance with Equation 1:

$$V_n = \sum_{j=1}^{k} \beta_j MA_j + DF_n + \varepsilon$$

In Equation 1, $V_n$ is a predicted level of demand for the content item V at time n, k is a number of moving averages utilized in the prediction model, $MA_j$ is a $j^{th}$ moving average of the number of moving averages, $\beta_j$ is a $j^{th}$ weight vector, $DF_n$ comprises day features, and $\varepsilon$ (epsilon) is an intercept term. In one example, the weight vectors $\beta_j$ for each j from 1 to k are learned by the gradient boosted machine.

The j moving average features may include (e.g., for various time lags): simple moving average features, exponential moving average features, double exponential moving average features, exponential smoothing of moving average features, weighted moving average features, zero lag exponential moving average features, rates of change of moving average features, momentum of moving average features, deviation of moving average features, moving average convergence and divergence features, relative strength index moving average features, moving average envelope features, moving average non-linear trending features (e.g., parabolic fit, cubic fit, spline fit coefficients, Fourier transform frequency/power, etc.), and so forth.

In one example, the content distribution nodes may be deployed at and/or may comprise network aggregation points; points that connect to consumers at the network edge and points in the core network (e.g., aggregation points that connect edges and other core network components). Caching content at aggregation points may assist a network operator in optimizing for network throughput insofar as content requests that can be serviced from a cache closest to a consumer may avoid additional network traffic to obtain the content from a distributor or from a higher level cache elsewhere in the network. In accordance with the present disclosure, content that is accessed by multiple consumers should be placed as closely in the network space to the consumers as possible before the content is requested, and so that it can be reused by as many consumers as possible.

In one example, the present disclosure observes content fetches over time (e.g., up to 90 days, up to 120 days, etc.), assembles moving average features from the observed content fetches, predicts, based upon the moving average features, content that will be in demand at one or more future time periods, and caches the content closer to the consumer devices in advance of the one or more future time periods. In one embodiment, the objective is for prefetching content to improve overall network throughput.

In one example, the present disclosure may also cache secondary content that is similar or related to the primary content that is predicted to be in demand at the one or more future time periods. For instance, the secondary content may comprise advertising content that may be matched to the primary content in some way. In the context of advertising, this similar content is reusable, and the present disclosure may learn what content is being reused based on the content requests. It should be noted that secondary content, such as advertising content, may be localized to a geography. In one example, the content distribution nodes may share information with neighboring content distribution nodes regarding the content in the respective caches. For instance, content features from existing and previous cache contents may be collected at each content distribution node (e.g., length of content, content target demographic information, and other advertising content tags). These features may be collected through content requests to content features sources. As such, in one example, a content distribution node that is caching secondary content in connection with a primary content may first make cache requests for the secondary content from neighboring content distribution nodes (e.g., single hop away content distribution nodes). In one example, requests for secondary content are added to a same cache update schedule as the primary contents that are to be requested.

Given the cache update schedules at each content distribution node, the present disclosure may place content in caches in an efficient manner, e.g., without negative impact or with minimal impact on network throughput. In this regard, the present disclosure may track overall network throughput, find throughput availability (e.g., times where network throughput is minimal), and recover a schedule of throughput availability to distribute to the content distribution nodes. In one example, the present disclosure employs a second prediction model that uses historical throughput data collected from the communication network. In one example, the second prediction model is also a linear model that is trained with time series features computed from the observed historical throughput in accordance with a gradient boosted machine. For instance, the time series features may comprise various moving averages of the same or a similar nature as discussed above, but with respect to the throughput as the source data. In one example, time series features may be derived from throughput measures for each node (e.g., individually). In another example, time series features may be derived from throughput measures collectively for a plurality of nodes, e.g., based upon the average throughput measures, based upon an aggregation of the throughput measures, etc.

In one example, the second prediction model may be in accordance with Equation 1 above, but where $V_n$ is a predicted level of network throughput V at time n, k is a number of moving averages utilized in the prediction model, $MA_j$ is a $j^{th}$ moving average of the number of moving averages, $\beta_j$ is a $j^{th}$ weight vector, $DF_n$ comprises day features, and $\varepsilon$ (epsilon) is an intercept term.

In one example, each content distribution node is assigned a slice of a throughput availability schedule. Then, each content distribution node may schedule local cache updates based on the recovered cache update schedule for retrieving content and an assigned slice of the throughput availability schedule (e.g., comprising at least an assigned time period, and in one example, further comprising a bandwidth assignment, or bandwidth limitation/cap).

It should be noted that in overly constrained operational states, not all content requests can be served. In this case, the present disclosure may optimize to find the best pairing of cache updates with throughput availability. In one example, the present disclosure may optimize in accordance with a job-shop scheduling problem; where there are many jobs (cache update requests) and a resource (throughput availability) to optimize its utilization. The job-shop scheduling problem can be solved using any one or more heuristic optimization methods and may be deployed centrally (e.g., prior to assignment of throughput availability schedule slices to particular content distribution nodes), and/or may be deployed locally at each content distribution node (e.g., to prioritize among different cache update requests for that particular content distribution node). In any case, each content distribution node may execute an individual cache update plan to update the contents of the local cache.

The above described processes may run over all content distribution nodes in a content distribution system of a communication network. A centralized throughput forecasting system may run at regular intervals and may push throughput availability schedules to content distribution nodes. When a new content request arrives at a content distribution node, the request is checked against cache contents: the content distribution node returns the content on a hit, and a miss results in the request being routed to one or more other content distribution nodes, e.g., single hop away nodes and/or nodes that are in a next level of a content distribution system hierarchy.

It should also be noted that although examples of the present disclosure are described primarily in connection with video streaming, examples of the present disclosure may be similarly applied to other types of streaming media, such as audio streaming. In addition, aspects of the present disclosure are equally applicable to live video streaming and on-demand streaming of recorded video programs. Similarly, although aspects of the present disclosure may be focused upon streaming via cellular networks, the present disclosure is also applicable to other types of networks and network infrastructures, including wired or wireless networks (e.g., home broadband), and so forth. These and other aspects of the present disclosure are described in greater detail below in connection with the examples of FIGS. 1-3.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of videos or other content items. In this regards, servers 149 may represent "origin servers" which may originate content that may be stored in and distributed via content distribution network (CDN) 170. In addition, the content from servers 149 that may be stored in and distributed via content distribution network (CDN) 170 may include video programs, e.g., movies, television shows, video news programs, sports video content, and so forth, as well as video advertisements.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions comprise a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

Network 100 may also include a content distribution network (CDN) 170. In one example, CDN 170 may be operated by a different entity from the core network 110. In another example, CDN 170 may be operated by a same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end users, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth.

In one example, edge server 174 may comprise a streaming video server. In one example, ingest server 172 and/or edge server 174 may comprise all or a portion of a computing device or system, such as computing system 300, and/or processing system 302 as described in connection with FIG. 3 below, specifically configured to perform various steps, functions, and/or operations in connection with transferring a content item to a content distribution node prior to a time period in which a predicted level of demand for the content item exceeds a threshold level of demand.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

As mentioned above, TV servers 112 in core network 110 may also include one or more interactive TV/video-on-demand (VoD) servers and/or network-based DVR servers. In one example, an interactive TV/VoD server and/or DVR server may comprise all or a portion of a computing device or system, such as computing system 300, and/or processing system 302 as described in connection with FIG. 3 below, specifically configured to perform various steps, functions, and/or operations in connection transferring a content item to a content distribution node prior to a time period in which a predicted level of demand for the content item exceeds a threshold level of demand, as described herein. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client video player. For example, STB/DVR 162A may present a user interface and receive one or more inputs (e.g., via remote control 168A) for a selection of a video. STB/DVR 162A may request the video from an interactive TV/VoD server and/or network-based DVR server, which may retrieve a manifest file for the video from one or more of application servers 114 and provide the manifest file to STB/DVR 162A. STB/DVR 162A may then obtain one or more portions of the video from one or more network-based servers, such as one of the TV servers 112, edge server 174 in CDN 170, and so forth, as directed via the manifest file.

To illustrate, the manifest file may direct the STB/DVR 162A to obtain the video from edge server 174 in CDN 170. The edge server 174 may already store the video (or at least a portion thereof) and may deliver the video upon a request from the STB/DVR 162A. However, if the edge server 174 does not already store the video, upon request from the STB/DVR 162A, the edge server 174 may in turn request the video from an origin server. The origin server which stores the video may comprise, for example, one of the servers 149 or one of the TV servers 112. The video may be obtained from an origin server via ingest server 172 before passing the video to the edge server 174. In one example, the ingest server 172 may also pass the video to other middle tier servers and/or other edge servers (not shown) of CDN 170. The edge server 174 may then deliver the video to the STB/DVR 162A and may store the video until the video is removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 167A, 167B, 157A or 157B obtaining a manifest file for a video from one of the TV servers 112, from one of the servers 149, etc., and requesting and obtaining videos from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve to deliver the video to the requesting device, etc. However, depending upon the location of the requesting device, the access network utilized by the requesting device, and other factors, portions of the video may be delivered via various networks, various links, and/or various intermediate devices. For instance, in one example, edge server 174 may deliver all or a portion of the video to a requesting device in home network 160 via access network 120, e.g., an ISP network. In another example, edge server 174 may deliver all or a portion of the video to a requesting device in home network 160 via core network 110 and access network 120. In still another example, edge server 174 may deliver all or a portion of the video to a requesting device such as mobile device 157A or 1576 via core network 110 and wireless access network 150.

In accordance with the present disclosure, devices in CDN 170, such as edge server 174, may be referred to as content distribution nodes. Accordingly, edge server 174 may perform various operations in connection with examples of the present disclosure for transferring a content item to a content distribution node prior to a time period in which a predicted level of demand for the content item exceeds a threshold level of demand. For instance, an example method 200 for transferring a content item to a content distribution node prior to a time period in which a predicted level of demand for the content item exceeds a threshold level of demand is illustrated in FIG. 2 and described in greater detail below. Among other things, edge server 174 may collect a first set of time series features relating to requests for a content item at a content distribution node in a communication network, generate a first prediction model based upon the first set of time series features to predict levels of demand for the content item at the content distribution node at future time periods, identify, via the first prediction model, a first time period of the future time periods when a predicted level of demand for the content item exceeds a threshold level of demand, identify a second time period of the future time periods when a predicted level of utilization of the communication network is below a threshold level of utilization, the second time period being prior to the first time period, and transfer the content item to the content distribution node in the second time period.

In one example, edge server 174 may track requests for content items (e.g., videos) from various client devices (e.g., customer endpoint devices, such as STB/DVRs 162A and 162B, mobile devices 157A, 157B, 167A, 167B, and so forth) to build time series features which are used to train a prediction model in accordance with a gradient boosted machine. For instance, the prediction model may be in the form of Equation 1 as described above, or may have a similar format.

In one example, the edge server 174 may obtain an identification of the second time period from another device or system. For instance, one or more of application servers 114 may perform operations to predict times of opportunity where network throughput may be low, and which may allow for cache updating. To illustrate, the one or more of application servers 114 may collect a second set of time series features relating to a utilization of the network 100. For example, utilization metrics may be obtained from edge server 174, ingest server 172, wireless access network 150, NEs 111A-111D, TV servers 112, and so forth, and may be aggregated into various time series features. The one or more of application servers 114 may then generate a second prediction model based upon the second set of time series features to predict the levels of utilization of the communication network at the future time periods. The second prediction model may similarly be trained in accordance with a gradient boosted machine. In one example, the one or more of application servers 114 may assign time periods from among those that may be identified in accordance with the second prediction model to various content distribution nodes, such as edge server 174. For example, various criteria may be used to assign time slots and/or bandwidth within such time slots to various content distribution nodes.

Alternatively, or in addition, edge server 174 may track network throughput within a portion of the network relevant to the edge server 174 (e.g., as defined by a network operator, or as automatically determined by the edge server 174 based upon a number of hops in the network, based upon a digital subscriber line access multiplexer (DSLAM) service area, based upon a cellular network aggregation point, etc.), may generate the second prediction model, and may identify the second time period of the future time periods when a predicted level of utilization of the communication network is below a threshold level of utilization via the second prediction model. In other words, edge server 174 may operate independent of any centralized control to determine when the network 100 may support cache updating.

In one example, edge server 174 may generate different prediction models for different content items, and may prioritize obtaining of different content items (e.g., videos) according to respective predicted levels of demand for the different content item, the time periods of such predicted levels of demand, the sizes of the different content items, and any one or more periods of time that are identified when a predicted level of utilization of the communication network is below a threshold level (e.g., any time periods that may be assigned to the edge server 174).

Further details regarding the functions that may be implemented by edge server 174, ingest server 172, application servers 114, TV servers 112, servers 149, STBs/DVRs 162A and 162B, TV 163A, TV 163B, mobile devices 157A, 157B, 167A and 167B, and/or PC 166 are discussed in greater detail below in connection with the example of FIG. 2. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

FIG. 2 illustrates a flowchart of a method 200 for transferring a content item to a content distribution node prior to a time period in which a predicted level of demand for the content item exceeds a threshold level of demand, in accordance with the present disclosure. In one example, the method 200 is performed by an a content distribution node, such as edge server 174 of FIG. 1, ingest server 172, or one of TV servers 112, or any one more components thereof, such as a processing system, or by one of these devices in conjunction with other devices and/or components of network 100 of FIG. 1. In one example, the steps, functions, or operations of method 200 may be performed by a computing device or system 300, and/or a processing system 302 as described in connection with FIG. 3 below. For instance, the computing device or system 300 may represent any one or more components of the network 100 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system, and each instance may represent one of edge server 174, ingest server 172, one of TV servers 112, one of application servers 114, and so forth in FIG. 1. For illustrative purposes, the method 200 is described in greater detail below in connection with an example performed by a processing system, such as processing system 302. The method 200 begins in step 205 and proceeds to step 210.

At step 210, the processing system collects a first set of time series features relating to requests for a content item at a content distribution node in a communication network. For instance, the first set of time series features may comprise moving averages of content requests at different intervals of time. In one example, the first set of time series features further comprises functions of the moving averages, which may include: an exponential moving average that is based upon at least a portion of the moving averages, a double exponential moving average that is based upon at least a portion of the moving averages, an exponential smoothing moving average that is based upon at least a portion of the moving averages, and so forth. In one example, the different intervals of time may range from a day to at least 30 days (e.g., up to 60 days, 90 days, 120 days, 180 days, etc.). In addition, in one example, the different intervals of time include intervals of time relating to particular days of the week (e.g., moving averages relating to content requests on successive Mondays, Tuesdays, etc.)

At step 220, the processing system generates a first prediction model based upon the first set of time series features to predict levels of demand for the content item at the content distribution node at one or more future time periods. For instance, the first prediction model may be trained in accordance with a gradient boosted machine. In one example, the prediction model is in accordance with Equation 1 above, or at least the first term thereof (e.g.

$$V_n = \sum_{j=1}^{k} \beta_j MA_j),$$

where $V_n$ is a predicted level of demand for the content item at time n, k is a number of moving averages utilized in the prediction model, $MA_j$ is a $j^{th}$ moving average of the number of moving averages, and $\beta_j$ is a $j^{th}$ weight vector. In one example, $\beta_j$ for each j from 1 to k is learned via the gradient boosted machine.

At step 230, the processing system identifies, via the first prediction model, a first time period of the future time periods in which a predicted level of demand for the content item exceeds a threshold level of demand. For instance, the threshold level of demand may be an absolute score which may be set by a system operator, or which may be learned over time. In one example, a network operator may set a threshold relating to the percentile of the score (e.g., an 80th percentile, an $85^{th}$ percentile, a $95^{th}$ percentile, etc.) where the percentiles may be learned over time based upon prediction scores for various content items over a sliding time window (e.g., within the last 3 months, within the last 6 months, etc.). In one example, the threshold may be a threshold ranking of the predicted demand for the content item with respect to the predicted demands for other content items during the first time period and/or during a larger time window comprising the future time period (e.g., within a three hour window centered on the future time period, within a two hour window including the future time period, etc.).

At optional step 240, the processing system may collect a second set of time series features relating to a utilization of the communication network. For instance, the utilization of the communication network may comprise throughput measures of a plurality of network elements of the communication network, which may include content distribution nodes and/or other network elements, such as routers, switches, application servers, TV servers, and so forth.

At optional step 250, the processing system may generate a second prediction model based upon the second set of time series features to predict levels of utilization of the communication network at the future time periods. For instance, the second prediction model may be similarly trained in accordance with a gradient boosted machine. In one example, the second prediction model may be in accordance with Equation 1 above, but where $V_n$ is a predicted level of network throughput V at time n, k is a number of moving averages utilized in the prediction model, $MA_j$ is a $j^{th}$ moving average of the number of moving averages, $\beta_j$ is a $j^{th}$ weight vector. In one example, $\beta_j$ for each j from 1 to k is learned via the gradient boosted machine.

At step 260, the processing system identifies a second time period of the future time periods in which a predicted level of utilization of the communication network is below a threshold level of utilization, wherein the second time period is prior to the first time period. In one example, the identifying the second time period of the future time periods in which the predicted level of utilization of the communication network is below the threshold level of utilization is in accordance with the second prediction model to predict levels of utilization of the communication network at the future time periods. For instance, the second prediction model may be trained in accordance with optional steps 240 and 250 above.

In one example, the processing system may include a content distribution node, and the collecting of optional step 240 and the generating of optional step 250 may be performed at a different component of the communication network. For instance, the processing system may further comprise one or more centralized network-based servers which may perform optional steps 240 and 250, and which may provide a notification to the content distribution node of the second time period. For example, the identifying of the second time period may comprise receiving an assignment of the second time period to the content distribution node for a transfer of one or more content distribution items to the content distribution node over the communication network. In one example, the assignment may also include a bandwidth assignment (e.g., a limitation or cap). For instance, the second time period may be determined to be a time where the communication network has additional spare capacity. However, the additional spare capacity may be spread among multiple content distribution nodes, which may be allowed to simultaneously perform cache update operations.

In one example, the threshold level of utilization comprises a level of utilization that provides a capacity to transfer the content item to the content distribution node. For instance, in one example, the content distribution node may report to one or more centralized network-based servers the predicted demand for the content item (and in one example predicted demands for a plurality of content items), and may then receive an assignment of one or more time periods (e.g., including the second time period) to the content distribution node based upon the level(s) of demand for one or more content items, the time period(s) at which the future demand(s) is/are predicted, the relation of such time period(s) to the current time, and so forth.

In one example, the assignment of time periods to different content distribution nodes may be based upon the utilization level of each content distribution node as compared to other content distribution nodes, without specifically receiving demand levels from the respective content distribution nodes. For instance, content distribution nodes with the highest utilizations may be provided with more time periods and/or more capacity within time periods for cache update operations. In one example, the one or more centralized network-based servers may select time period assignments (and in one example, may additionally select bandwidth constraints) in accordance with a job-shop scheduling process.

In another example, the content distribution node may be given a schedule of predicted network capacity and may utilize any open time periods where the predicted utilization is sufficiently low. In other words, step 260 may comprise identifying the second time period as having a predicted level of utilization that is sufficient to provide a capacity to transfer the content item to the content distribution node. The sufficiency of capacity may be calculated by observing the size (data volume) of the content item, the duration of the second time period, and in one example, the bandwidth limitation. If the bandwidth and time duration allow for the transfer of the data volume, the second time period may be determined to be available for cache updating at the content distribution node.

At step 270, the processing system transfers the content item to the content distribution node in the second time period (e.g., in response to identifying the second time period). In other words, step 270 may comprise cache update operations for the content distribution node. In one example, the content distribution node may receive one or more time period assignments (along with possible bandwidth limits) and then the content distribution node may select among competing predicted demands associated with different content items at various future time periods according to a job-shop scheduling process.

In one example, the content distribution node may receive an assignment of network capacity during time of low utilization of the communication network. However, the second time period may still be assigned along with a bandwidth limitation, in response to which the content distribution node may then prioritize among its competing predicted demands for different content items. For instance, predicted demands for different content items may be for different future time periods, but the time periods available for transfer may not all have capacity for all content demands. Therefore some content items with a predicted demand for a later time periods may be selected to be transferred to the content distribution node (e.g., obtained and stored in the cache of the content distribution node) sooner than content items with a predicted demand at an earlier time period. As described above, the balancing of these different demands for content items may depend upon the durations and/or bandwidth limitations of different time periods for transfer, may depend upon the respective data volumes of the different content items, and so forth.

At optional step 280, the processing system may identify at least one additional content item that is/are related to the content item. For instance, in one example, the additional content item(s) may be determined to be related to the content item based upon topical labels assigned to the content item and to the additional content item(s). In one example, the additional content item(s) may comprise at least one video advertisement.

At optional step 290, the processing system may obtain the additional content item(s) from at least one additional content distribution node in the communication network during the second time period. In one example, the processing system may select the number and/or durations of additional content items based upon the total duration of the content item (e.g., the length of a television program or movie). In one example, the processing system may request the additional content item(s) initially from peer content distribution nodes (e.g., single hop peers). If all or a portion of the additional content item(s) is/are unable to be sourced from the peer content distribution nodes, then the processing system may seek all or a portion of the additional content item(s) from a node in a next hierarchical layer of a content distribution network of which the content distribution node is a part. In one example optional steps 280 and 290 may proceed simultaneous with and/or in conjunction with step 270. For instance, the transferring of the content item at step 270 and the obtaining of the additional content item(s) at step 290 may both be performed during the second time period.

Following any one or more of step 270, optional step 280, or optional step 290, the method 200 may proceed to step 295. At step 295 the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-220 to retrain/update the first prediction model in accordance with more current information regarding requests for the content item, optional steps 240-250 to retrain/update the second prediction model in accordance with more current information regarding network utilization/throughput, and so forth. In one example, the processing system may repeat steps 210-270, or steps 210-290, for additional content items. In another example, the method 200 may additionally include the processing system (e.g., the content distribution node) communicating with peer content distribution nodes to exchange lists of content items cached at the respective content distribution nodes. For instance, this may be performed in advance of or as part of optional step 280. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure. The method 200 may also be expanded to include additional steps. Thus, these and other modifications are all contemplated within the scope of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the system 300. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for transferring a content item to a content distribution node prior to a time period in which a predicted level of demand for the content item exceeds a threshold level of demand, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for transferring a content item to a content distribution node prior to a time period in which a predicted level of demand for the content item exceeds a threshold level of demand (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for transferring a content item to a content distribution node prior to a time period in which a predicted level of demand for the content item exceeds a threshold level of demand (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    collecting, by a processing system including at least one processor, a first set of time series features relating to requests for a content item at a content distribution node in a communication network, wherein the first set of time series features comprises moving averages of content requests at different intervals of time, wherein the different intervals of time range from a day to at least 30 days, and wherein the different intervals of time include intervals of time relating to particular days of a week;
    generating, by the processing system, a first prediction model based upon the first set of time series features to predict levels of demand for the content item at the content distribution node at future time periods;
    identifying, by the processing system via the first prediction model, a first time period of the future time periods in which a predicted level of demand of the levels of demand for the content item exceeds a threshold level of demand;
    identifying, by the processing system, a second time period of the future time periods in which a predicted level of utilization of the communication network is below a threshold level of utilization, wherein the second time period is prior to the first time period; and
    transferring, by the processing system, the content item to the content distribution node in the second time period.

2. The method of claim 1, wherein the first prediction model is in accordance with $$V_n = \sum_{j=1}^{k} \beta_j MA_j,$$

where $V_n$ is a predicted level of demand for the content item at time n, k is a number of moving averages utilized in the first prediction model, $MA_j$ is a $j^{th}$ moving average of the number of moving averages, and $\beta_j$ is a $j^{th}$ weight vector.

3. The method of claim 2, wherein $\beta_j$ for each j from 1 to k is learned via a gradient boosted machine.

4. The method of claim 1, wherein the first prediction model is trained in accordance with a gradient boosted machine.

5. The method of claim 1, wherein the identifying the second time period of the future time periods in which the predicted level of utilization of the communication network is below the threshold level of utilization is in accordance with a second prediction model to predict levels of utilization of the communication network at the future time periods.

6. The method of claim 5, wherein the second prediction model is trained in accordance with a gradient boosted machine.

7. The method of claim 5, further comprising:
    collecting a second set of time series features relating to a utilization of the communication network; and
    generating the second prediction model based upon the second set of time series features to predict the levels of utilization of the communication network at the future time periods.

8. The method of claim 7, where the utilization of the communication network comprises throughput measures of a plurality of network elements of the communication network.

9. The method of claim 7, wherein the processing system comprises a processing system of the content distribution node, wherein the collecting the second set of time series features and the generating the second prediction model are performed at a different component of the communication network.

10. The method of claim 9, wherein the identifying the second time period comprises receiving an assignment of the second time period to the content distribution node for a transfer of one or more content distribution items to the content distribution node over the communication network.

11. The method of claim 1, wherein the threshold level of demand comprises a ranking of the content item among other content items according to the predicted level of demand for the content item.

12. The method of claim 1, wherein the threshold level of utilization comprises a level of utilization that provides a capacity to transfer the content item to the content distribution node.

13. The method of claim 1, further comprising:
identifying at least one additional content item that is related to the content item; and
obtaining the at least one additional content item from at least one additional content distribution node in the communication network during the second time period.

14. The method of claim 13, wherein the at least one additional content item is determined to be related to the content item based upon topical labels assigned to the content item and to the at least one additional content item.

15. An apparatus comprising:
a processing system including at least one processor; and
a computer-readable medium storing instructions which, when executed by the processing system, cause the processing system to perform operations, the operations comprising:
collecting a first set of time series features relating to requests for a content item at a content distribution node in a communication network, wherein the first set of time series features comprises moving averages of content requests at different intervals of time, wherein the different intervals of time range from a day to at least 30 days, and wherein the different intervals of time include intervals of time relating to particular days of a week;
generating a first prediction model based upon the first set of time series features to predict levels of demand for the content item at the content distribution node at future time periods;
identifying, via the first prediction model, a first time period of the future time periods in which a predicted level of demand of the levels of demand for the content item exceeds a threshold level of demand;
identifying a second time period of the future time periods in which a predicted level of utilization of the communication network is below a threshold level of utilization, wherein the second time period is prior to the first time period; and
transferring the content item to the content distribution node in the second time period.

16. A non-transitory computer-readable medium storing instructions which, when executed by a processing system including at least one processor, cause the processing system to perform operations, the operations comprising:
collecting a first set of time series features relating to requests for a content item at a content distribution node in a communication network, wherein the first set of time series features comprises moving averages of content requests at different intervals of time, wherein the different intervals of time range from a day to at least 30 days, and wherein the different intervals of time include intervals of time relating to particular days of a week;
generating a first prediction model based upon the first set of time series features to predict levels of demand for the content item at the content distribution node at future time periods;
identifying, via the first prediction model, a first time period of the future time periods in which a predicted level of demand of the levels of demand for the content item exceeds a threshold level of demand;
identifying a second time period of the future time periods in which a predicted level of utilization of the communication network is below a threshold level of utilization, wherein the second time period is prior to the first time period; and
transferring the content item to the content distribution node in the second time period.

17. The non-transitory computer-readable medium of claim 16, wherein the first prediction model is trained in accordance with a gradient boosted machine.

18. The non-transitory computer-readable medium of claim 16, wherein the identifying the second time period of the future time periods in which the predicted level of utilization of the communication network is below the threshold level of utilization is in accordance with a second prediction model to predict levels of utilization of the communication network at the future time periods.

19. The non-transitory computer-readable medium of claim 18, wherein the second prediction model is trained in accordance with a gradient boosted machine.

20. The non-transitory computer-readable medium of claim 18, wherein the operations further comprise:
collecting a second set of time series features relating to a utilization of the communication network; and
generating the second prediction model based upon the second set of time series features to predict the levels of utilization of the communication network at the future time periods.

* * * * *